(12) United States Patent
Zhang et al.

(10) Patent No.: US 9,976,885 B2
(45) Date of Patent: May 22, 2018

(54) ULTRASONIC MEASUREMENT SYSTEM AND MEASUREMENT METHOD THEREOF

(71) Applicant: Audiowell Electronics (Guangdong) Co., Ltd., Guangdong (CN)

(72) Inventors: Shuguang Zhang, Guangdong (CN); Xiongbing Kang, Guangdong (CN); Jinhui Huang, Guangdong (CN)

(73) Assignee: AUDIOWELL ELECTRONICS (GUANGDONG) CO., LTD., Guangdong (CN)

( * ) Notice: Subject to any disclaimer, the term of this patent is extended or adjusted under 35 U.S.C. 154(b) by 56 days.

(21) Appl. No.: 15/308,296

(22) PCT Filed: Aug. 6, 2015

(86) PCT No.: PCT/CN2015/086191
§ 371 (c)(1),
(2) Date: Nov. 1, 2016

(87) PCT Pub. No.: WO2016/127601
PCT Pub. Date: Aug. 18, 2016

(65) Prior Publication Data
US 2017/0184431 A1    Jun. 29, 2017

(30) Foreign Application Priority Data
Feb. 13, 2015 (CN) .......................... 2015 1 0082634

(51) Int. Cl.
*G01F 1/00* (2006.01)
*G01F 1/66* (2006.01)
(52) U.S. Cl.
CPC .................................... *G01F 1/667* (2013.01)
(58) Field of Classification Search
CPC ..... G01F 1/66; G01F 7/00; G01F 1/20; G01F 1/86; G01F 1/00
See application file for complete search history.

(56) References Cited

U.S. PATENT DOCUMENTS 5,987,997 A    11/1999  Roskam et al.
7,581,453 B2 *  9/2009  Ao ........................ G01F 1/663
                                                              73/861.27
(Continued)

FOREIGN PATENT DOCUMENTS

CN    202676217 U    1/2013
CN    203688007 U    7/2014
(Continued)

OTHER PUBLICATIONS

Chinese Search Report for CN Application No. 2015100826340.
International Search Report and Written Opinion for PCT Application No. PCT/CN2015/086191, dated Oct. 20, 2015.

*Primary Examiner* — Jewel V Dowtin
(74) *Attorney, Agent, or Firm* — McDonnell Boehnen Hulbert & Berghoff LLP

(57) ABSTRACT

An ultrasonic measurement system and a measurement method thereof are disclosed. The system includes a subsystem summarization processing device, and at least two measurement subsystems mounted on different regions to be measured, each measurement subsystem includes a primary measurement sensor and a secondary measurement sensor, the primary measurement sensor includes a first housing, and a first transduction element, a measurement processing element and a signal control element mounted within the first housing respectively, the signal control element is coupled to the first transduction element and the measurement processing element respectively, the first transduction element is mounted on a bottom end surface of the first housing, the secondary measurement sensor includes a second housing and a second transduction element mounted on a bottom end surface of the second housing, the second transduction element is coupled to the signal control element, and the measurement processing element of each of the measurement subsystems is coupled to the subsystem (Continued)

summarization processing device respectively. The measurement accuracy can be improved by implementing the present invention.

10 Claims, 3 Drawing Sheets

(56) References Cited

U.S. PATENT DOCUMENTS

| | | | | |
|---|---|---|---|---|
| 7,654,151 B2* | 2/2010 | Agar | ............. | G01F 1/50 |
| | | | | 73/861.01 |
| 7,832,282 B2* | 11/2010 | Ao | ............. | G01F 1/66 |
| | | | | 73/861.26 |
| 7,984,637 B2* | 7/2011 | Ao | ............. | G01F 25/0007 |
| | | | | 73/1.16 |
| 8,424,392 B2* | 4/2013 | Kroemer | ............. | G01F 1/662 |
| | | | | 73/861.18 |
| 2012/0060944 A1 | 3/2012 | Lansing et al. | | |
| 2012/0132291 A1* | 5/2012 | Monkowski | ............. | F15D 1/025 |
| | | | | 137/14 |
| 2013/0080080 A1 | 3/2013 | Forbes et al. | | |
| 2013/0186486 A1* | 7/2013 | Ding | ............. | G01F 25/003 |
| | | | | 137/487 |
| 2015/0323364 A1 | 11/2015 | Sakaguchi et al. | | |
| 2016/0169730 A1* | 6/2016 | Wang | ............. | G01F 25/0007 |
| | | | | 702/100 |

FOREIGN PATENT DOCUMENTS

| | | |
|---|---|---|
| CN | 204461510 U | 7/2015 |
| WO | 2008/013957 A1 | 1/2008 |
| WO | 2016/127601 A1 | 8/2016 |

\* cited by examiner

ULTRASONIC MEASUREMENT SYSTEM AND MEASUREMENT METHOD THEREOF

CROSS REFERENCE TO RELATED APPLICATIONS

The present application is a national stage entry of, and claims priority to, PCT/CN2015/086191, filed on Aug. 6, 2015, which claims priority to Chinese Patent Application CN 201510082634.0, filed on Feb. 13, 2015, both of which are hereby incorporated in their entirety herein by reference.

FIELD

The present disclosure relates generally to the technical field of the flow measurement, and more particularly, to an ultrasonic measurement system and a measurement method thereof.

BACKGROUND

An ultrasonic flowmeter (USF) is a device for the measurement of the volume of a fluid based on the variation in the propagation speed of an ultrasonic beam which varies when the fluid is flowing. The ultrasonic flowmeter generally comprises two ultrasonic sensors which are receivers and emitters for ultrasonic wave signals and electrical signals to each other. Each ultrasonic sensor comprises a housing, and a piezoelectric ceramic plate which may be energized by a driving signal to make the end plane of the lower part of the housing vibrate to create ultrasound waves. The ultrasonic sensor is used for the flow measurement, and adapted to transmit the reception signal to a flow processing device via a connecting line between the ultrasonic sensor and the flow processing device.

However, the reception signal of the ultrasonic sensor may be attenuated during transmission, resulting in the decrease in the accuracy of the measurement of flow by the flow processing device.

SUMMARY

Based on the above, it is necessary to provide an ultrasonic measurement system and a measurement method thereof to address the problem that the reception signal of the ultrasonic sensor is attenuated during transmission, which causes the decrease in the accuracy of the measurement of flow by the flow processing device.

An ultrasonic measurement system is provided, including a subsystem summarization processing device, and at least two measurement subsystems mounted on different areas to be measured, each measurement subsystem including a primary measurement sensor and a secondary measurement sensor, the primary measurement sensor including a first housing, and a first transduction element, a measurement processing element and a signal control element mounted within the first housing respectively, the first transduction element being further mounted on a bottom end surface of the first housing, the secondary measurement sensor including a second housing, and a second transduction element mounted on a bottom end surface of the second housing, the signal control element being coupled to the first transduction element, the second transduction element and the measurement processing element respectively, and configured to transmit an electrical signal to the first and second transduction elements, the first and second transduction elements adapted to transduce the electrical signal into an ultrasonic wave signal and transmit the ultrasonic wave signal to a channel to be measured respectively, the first transduction element is further adapted to receive an ultrasonic wave signal transmitted by the second transduction element, transduce the received ultrasonic wave signal into a second reception signal and transmit the second reception signal to the signal control element, the second transduction element is further adapted to receive an ultrasonic wave signal transmitted by the first transduction element, transduce the received ultrasonic wave signal into a first reception signal and transmit the first reception signal to the signal control element, the signal control element is further configured to acquire signal parameters corresponding to the electrical signal, the first reception signal and the second reception signal, and transmit the corresponding signal parameters to the measurement processing element, the measurement processing element being configured to convert the corresponding signal parameters into a subsystem quantity for each measurement subsystem, the measurement processing element of each of the measurement subsystems is coupled to the subsystem summarization processing device respectively to transmit the subsystem quantity of the respective measurement subsystem to the subsystem summarization processing device, and the subsystem summarization processing device configured to convert the subsystem quantity of the respective measurement subsystem into a measured quantity.

A measurement method with the above ultrasonic measurement system is provided, comprising steps of:

transmitting, by each measurement subsystem, a first electrical signal of the signal control element to the first transduction element respectively;

receiving, by each measurement subsystem, a first reception signal obtained by a transduction of a received first ultrasonic wave signal by the second transduction element, into the signal control element respectively, wherein the first ultrasonic wave signal is transmitted by the first transduction element;

acquiring, by each measurement subsystem, a first signal parameter corresponding to the first reception signal received into the signal control element respectively;

transmitting, by each measurement subsystem, a second electrical signal of the signal control element to the second transduction element respectively;

receiving, by each measurement subsystem, a second reception signal obtained by a transduction of a received second ultrasonic wave signal by the first transduction element, into the signal control element respectively, wherein the second ultrasonic wave signal is transmitted by the second transduction element;

acquiring, by each measurement subsystem, a second signal parameter corresponding to the second reception signal received into the signal control element respectively;

transmitting, by each measurement subsystem, the first and the second signal parameter to the measurement processing element, such that the measurement processing element converts the first and the second signal parameter into the subsystem quantity of the respective measurement subsystem according to a preset measurement rule respectively; and transmitting, by each measurement subsystem, the subsystem quantity of the respective measurement subsystem to the subsystem summarization processing device, such that the subsystem summarization processing device converts the subsystem quantities of all the measurement subsystems into a measured quantity according to a preset summarization rule.

For the above ultrasonic measurement system and a measurement method thereof, the measurement is performed with the subsystem summarization processing device and at least two measurement subsystems mounted on different areas to be measured, each measurement subsystem having a signal control element and a measurement processing element independently. Each measurement subsystem can independently control the first and second transduction elements to transmit an ultrasonic wave signal or collect an ultrasonic wave signal, and acquire the signal parameters corresponding to the signal collected by the first and second transduction elements thought the signal control element, and can independently control the measurement processing element to process the signal parameters to generate the subsystem quantity directly. There is no requirement for the long-distance transmission of the signal collected by the primary and secondary measurement sensors, which can reduce the error caused by the propagation delay of the signal, while saving the transmission line and reducing the structure space of the measure device, and can effectively avoid the affect of the unstable factors in the external environment on the signal propagation, to improve the reliability and measurement accuracy of the measurement subsystem. Further, the subsystem quantity of each measurement subsystem can be transmitted to the subsystem summarization processing device respectively, such that the subsystem summarization processing device can convert the subsystem quantity of each measurement subsystem into a measured quantity, and the measured value measured in different measurement areas at the same time can be further converted into the measured quantity, to avoid the affect of the transient variation in the quantity to be measured on the final measured value, that is, a more accurate final measured value can be obtained by reference of the different measurement areas.

DETAILED DESCRIPTION OF THE PREFERRED EMBODIMENTS

The present disclosure may be best understood by reference to the following description taken in conjunction with the accompanying drawings.

Figure 1:
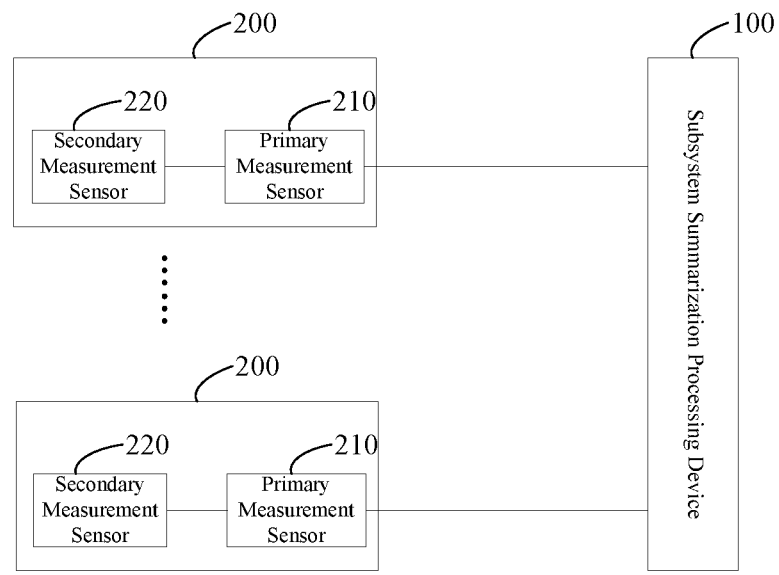
FIG. 1 is a structural schematic diagram illustrating a first implementation of the ultrasonic measurement system according to the present disclosure.
Figure 2:
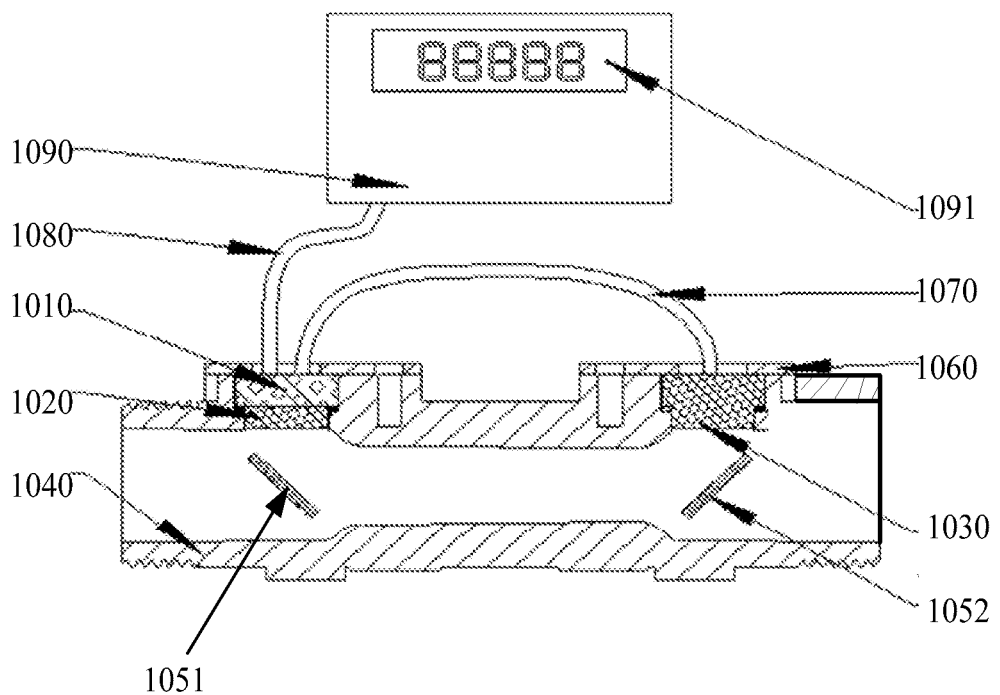
FIG. 2 is a structural schematic diagram illustrating a first implementation of the measurement subsystem in the ultrasonic measurement system according to the present disclosure.

Refer to FIGS. 1 and 2. FIG. 1 is a structural schematic diagram illustrating a first implementation of the ultrasonic measurement system according to the present disclosure, and FIG. 2 is a structural schematic diagram illustrating a first implementation of the measurement subsystem in the ultrasonic measurement system according to the present disclosure.

The ultrasonic measurement system of this implementation may include a subsystem summarization processing device 100, and at least two measurement subsystems 200 mounted on different areas to be measured. Each measurement subsystem may include a primary measurement sensor 210 and a secondary measurement sensor 220. As shown in FIG. 2, the primary measurement sensor 210 may include a first housing, and a first transduction element 1020, a measurement processing element and a signal control element mounted within the first housing respectively. The first transduction element 1020 may be further mounted on a bottom end surface of the first housing. The secondary measurement sensor may include a second housing, and a second transduction element 1030 mounted on a bottom end surface of the second housing. The signal control element is coupled to the first transduction element 1020, the second transduction element 1030 and the measurement processing element respectively, and configured to transmit an electrical signal to the first and second transduction elements 1020, 1030. The first and second transduction elements 1020, 1030 may be adapted to transduce the electrical signal into an ultrasonic wave signal and transmit the ultrasonic wave signal to a channel to be measured respectively. The first transduction element 1020 may be further adapted to receive an ultrasonic wave signal transmitted by the second transduction element 1030, transduce the received ultrasonic wave signal into a second reception signal and transmit the second reception signal to the signal control element. The second transduction element 1030 may be further adapted to receive an ultrasonic wave signal transmitted by the first transduction element 1020, transduce the received ultrasonic wave signal into a first reception signal and transmit the first reception signal to the signal control element. The signal control element may be further configured to acquire signal parameters corresponding to the electrical signal, the first reception signal and the second reception signal, and transmit the corresponding signal parameters to the measurement processing element. The measurement processing element may be configured to convert the corresponding signal parameters into a subsystem quantity for each measurement subsystem. The measurement processing element of each of the measurement subsystems 200 may be coupled to the subsystem summarization processing device 100 respectively to transmit the subsystem quantity of the respective measurement subsystem to the subsystem summarization processing device 100. The subsystem summarization processing device 100 may be configured to convert the subsystem quantity of the respective measurement subsystem into a measured quantity.

In this implementation, the measurement is performed with the subsystem summarization processing device and at least two measurement subsystems mounted on different areas to be measured, each measurement subsystem having a signal control element and a measurement processing element independently. Each measurement subsystem can independently control the first and second transduction elements to transmit an ultrasonic wave signal or collect an ultrasonic wave signal, and acquire the signal parameters corresponding to the signal collected by the first and second transduction elements thought the signal control element, and can independently control the measurement processing element to process the signal parameters to generate the subsystem quantity directly. There is no requirement for the long-distance transmission of the signal collected by the primary and secondary measurement sensors, which can reduce the error caused by the propagation delay of the signal, while saving the transmission line and reducing the structure space of the measure device, and can effectively avoid the affect of the unstable factors in the external environment on the signal propagation, to improve the reliability and measurement accuracy of the measurement subsystem. Further, the subsystem quantity of each measurement subsystem can be transmitted to the subsystem summarization processing device respectively, such that the subsystem summarization processing device can convert the subsystem quantity of each measurement subsystem into a measured quantity, and the measured value measured in different measurement areas at the same time can be further converted into the measured quantity, to avoid the affect of the transient variation in the quantity to be measured on the final measured value, that is, a more accurate final measured value can be obtained by reference of the different measurement areas.

The subsystem summarization processing device 100 may be a known processor in one of a desktop computer, a notebook computer, a personal digital assistant, a smart phone, a tablet computer and the like. The subsystem summarization processing device 100 may be mounted within the housing of the primary measurement sensor 210 of any one of the measurement subsystems.

In one embodiment, the ultrasonic measurement system may further includes a display device coupled to the subsystem summarization processing device 100, adapted to display the measured quantity and the subsystem quantity of each respective measurement subsystem.

The measurement subsystem 200 may be used to measure the quantity to be measured in different areas to be measured. If the ultrasonic measurement system is used to measure the liquid flow in a pipe of larger diameter, each of the measurement subsystems 200 can be mounted on a different cross section perpendicular to the diameter of the pipe along the diameter direction of the pipe respectively, such that each of the measurement subsystems 200 can be used for the flow velocity measurement in a different liquid layer respectively, and the subsystem summarization processing device 100 can convert the measured value of the respective measurement subsystem into the quantity of flow in the pipe.

Preferably, the measurement processing element may convert the corresponding signal parameters into the subsystem quantity of the respective measurement subsystem according to a preset measurement rule respectively, and transmit the subsystem quantity of the respective measurement subsystem to the subsystem summarization processing device 100. The subsystem summarization processing device 100 may convert the subsystem quantities of all the measurement subsystems into a measured quantity according to a preset summarization rule.

Further, the preset measurement rule may be a measurement rule of time difference method, a measurement rule of frequency difference method, a measurement rule of phase difference method or others. The preset summarization rule may be a weighted integration rule.

In one embodiment, the ultrasonic measurement system may further include a measurement pipe. The measurement subsystems may be mounted on different cross sections in an axial direction the measurement pipe respectively.

Further, each measurement subsystem 200 may further include a first and second reflection elements mounted within the measurement pipe. The first reflection element and the first transduction element have an angle of 45 degrees between each other, and the second reflection element and the second transduction element have an angle of 135 degrees between each other. Each group of the first and second reflection elements forms an ultrasonic wave transmission channel for each measurement subsystem 200 inside the measurement pipe.

The first and second housings may be metal housings. In other embodiments, they may be housings made of other materials.

The signal control element and the measurement processing element may be integrated on a same PCB 1010 which may be mounted within the first housing.

Preferably, the primary measurement sensor 210 may further include a pouring sealant shockproof layer which is filled between the PCB 1010 and an end face at the top of the first housing.

Preferably, the signal parameters corresponding to the electrical signal, the first reception signal and the second reception signal may include a transmission time for transmitting the electrical signal to the first transduction element 1020, a transmission time for transmitting the electrical signal to the second transduction element 1030, a time for the signal control element receiving the first reception signal, and a time for the signal control element receiving the second reception signal.

In other embodiments, the signal parameters corresponding to the electrical signal, the first reception signal and the second reception signal may further include a pulse number of pulse signals transmitted to the first transduction element before the signal control element receiving the first reception signal, and a pulse number of pulse signals transmitted to the second transduction element before the signal control element receiving the second reception signal.

Further, the primary measurement sensor 210 of this implementation may further include a pouring sealant shockproof layer which is filled between the PCB 1010 and an end face at the top of the first housing.

Further, the primary measurement sensor 210 of this implementation may further include a connecting component which may be a connecting wire, a connecting spring or others. The connecting component is connected between the PCB 1010 and the first transduction element 1020. In other embodiments, other connecting components may be arranged between the PCB 1010 and the first transduction element 1020.

The first and the second transduction elements 1020, 1030 may be piezoelectric ceramic plates. In other embodiments, the first and the second transduction elements 1020, 1030 may be other piezoelectric element made of conventional materials in the art, such as electrostriction piezoelectric crystals and magnetostriction Ni—Fe—Al alloys.

In one embodiment, the measurement process of the measurement subsystem 200 may include: the signal control element transmitting a first electrical signal to the first transduction element 1020, and acquiring the transmission time of the first electrical signal; the first transduction element 1020 transducing the first electrical signal into a first ultrasonic wave signal, and transmitting the first ultrasonic wave signal to the channel to be measured; the second transduction element 1030 receiving the first ultrasonic wave signal, transducing the first ultrasonic wave signal into a first reception signal, and transmitting the first reception signal to the signal control element; the signal control element receiving the first reception signal, and acquiring a reception time of the first reception signal; the signal control element transmitting a second electrical signal to the second transduction element 1030, and acquiring the transmission time of the second electrical signal; the second transduction element 1030 transducing the second electrical signal into a second ultrasonic wave signal, and transmitting the first ultrasonic wave signal to the channel to be measured; the first transduction element 1020 receiving the second ultrasonic wave signal, transducing the second ultrasonic wave signal into a second reception signal, and transmitting the first reception signal to the signal control element; the signal control element receiving the second reception signal, and acquiring a reception time of the second reception signal; the signal control element transmitting the transmission time of the first electrical signal, the reception time of the first reception signal, the transmission time of the second electrical signal and the reception time of the second reception signal to the measurement processing element; the measurement processing element converting the transmission time of the first electrical signal, the reception time of the first reception signal, the transmission time of the second electrical signal and the reception time of the second reception signal into a subsystem quantity according to a measurement rule of time difference method.

Preferably, the subsystem quantity may be a flow velocity or flow quantity of a liquid or gas in a corresponding measurement area in the measurement pipe.

In other embodiments, the measurement subsystem 200 may get the subsystem quantity about the flow quantity or other quantities to be measured based on a measurement principle of frequency difference method or a measurement principle of phase difference method.

Further, the measurement subsystem 200 of this implementation may further include a measurement display 1090, a first signal wire 1070 and a second signal wire 1080. The measurement processing element may transmit the measured quantity to the measurement display 1090 via the second signal wire 1080. The signal control element may be coupled to the second transduction element 1030 via the first signal wire 1070. The measurement display 1090 may include a display module 1091 for the display of the specific numerical value of the subsystem quantity.

The measurement subsystem 200 of this implementation may transmit the specific numerical value of the measured subsystem quantity outward, without transmitting the first or second reception signal (which is an analog signal) sensed by the sensor to another processing device, to avoid affecting the measurement result by the interference to the sensed first or second reception signal when transmitted with the wire. The measurement subsystem 200 can improve the measurement accuracy effectively when being used for the measurement of the flow quantity of the liquid or gas in the measure pipe.

In another embodiment, the measurement subsystem 200 may further include a measurement sub-pipe 1040 having a side wall including two installation openings. The primary measurement sensor 210 is mounted on a first installation opening of the two installation openings, and the secondary measurement sensor 220 is mounted on a second installation opening of the two installation openings.

Further, the measurement subsystem 200 may further include a first reflection element 1051 and a second reflection element 1052 mounted within the measurement sub-pipe 1040. The first reflection element 1051 and the first transduction element 1020 have an angle of 45 degrees between each other, and the second reflection element 1052 and the second transduction element have an angle of 135 degrees between each other. The first and second reflection element 1051, 1052 are adapted to reflect the ultrasonic wave signal to cause the ultrasonic wave signal to transmit to the first and second transduction element 1020, 1030.

Figure 3:
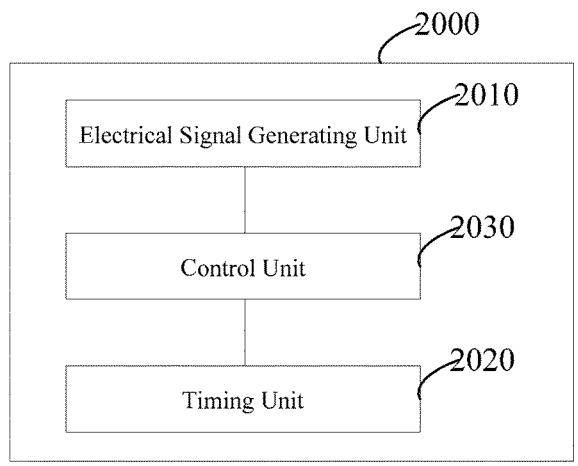
FIG. 3 is a structural schematic diagram illustrating a second implementation of the measurement subsystem in the ultrasonic measurement system according to the present disclosure.

Refer to FIG. 3, which is a structural schematic diagram illustrating a second implementation of the measurement subsystem in the ultrasonic measurement system according to the present disclosure.

The implementation of the measurement subsystem is different from the second implementation in that the signal control element 2000 may include an electrical signal generating unit 2010, a timing unit 2020 and a control unit 2030, the control unit 2030 being coupled to the timing unit 2020 and the electrical signal generating unit 2010 respectively, and the electrical signal generating unit 2010 being coupled to the first and second transduction elements respectively.

In this implementation, the measurement is performed by a time difference method.

The electrical signal generating unit 2010 may be a signal source.

When the primary measurement sensor acts as the ultrasonic wave transmitting end, the control unit 2030 may control the electrical signal generating unit 2010 to be in communication with the first transduction element so that the electrical signal generating unit 2010 transmits a first electrical signal to the first transduction element, and may transmit a triggering signal to the timing unit 2020 to start timing. The first transduction element may transduce the first electrical signal into a first ultrasonic wave signal and transmit the first ultrasonic wave signal to the channel to be measured. The second transduction element may receive the first ultrasonic wave signal, transduce the first ultrasonic wave signal into a first reception signal, and transmit the first reception signal to the control unit 2030. The control unit 2030 may receive the first reception signal, then transmit a triggering signal to the timing unit 2020 to terminate timing, and acquire a first signal parameter corresponding to the reception of the first reception signal (a transmission time for the first electrical signal transmitting to the first transduction element and a reception time for the control unit 2030 receiving the first reception signal) from the timing unit 2020.

When the primary measurement sensor acts as the ultrasonic wave receiving end, the control unit 2030 may control the electrical signal generating unit 2010 to be in communication with the second transduction element so that the electrical signal generating unit 2010 transmits a second electrical signal to the second transduction element, and may transmit a triggering signal to the timing unit 2020 to start timing. The second transduction element may transduce the second electrical signal into a second ultrasonic wave signal and transmit the second ultrasonic wave signal to the channel to be measured. The first transduction element may receive the second ultrasonic wave signal, transduce the second ultrasonic wave signal into a second reception signal, and transmit the second reception signal to the control unit 2030. The control unit 2030 may receive the second reception signal, then transmit a triggering signal to the timing unit 2020 to terminate timing, and acquire a second signal parameter corresponding to the reception of the second reception signal (a transmission time for the second electrical signal transmitting to the second transduction element and a reception time for the control unit 2030 receiving the second reception signal) from the timing unit 2020. The first and second signal parameter may be transmitted to the measurement processing element so that the measurement processing element convert the signal parameters into a subsystem quantity (such as flow quantity) according to a measurement rule of time difference method.

In one embodiment, the ultrasonic measurement system according to the present disclosure may used to detect the flow quantity of liquid. When the ultrasonic wave signals transmitted by the primary and secondary measurement sensors is propagating through the liquid, the flow of the liquid may cause small variation in the propagation times of the ultrasonic wave signals, and the variation in the propagation time is proportional to the flow velocity of the liquid. If it is provided that, the velocity of the ultrasonic wave signal in static fluid is c, the velocity of the flow of the fluid is u, and the propagation distance is L, when the direction of the ultrasonic wave signal transmitted by the primary measurement sensor is the same as that of the flow of the fluid (i.e., in the direction of flow), the propagation velocity of the ultrasonic wave signal is c+u, and when the direction of the ultrasonic wave signal transmitted by the primary measurement sensor is different from that of the flow of the fluid, the propagation velocity of the ultrasonic wave signal is c−u. A primary measurement sensor T1 and a secondary measurement sensor T2 are arranged on two locations which have a distance of L between one another. When the primary measurement sensor T1 transmits an ultrasonic wave signal in the direction of flow, and the secondary measurement sensor T2 transmits an ultrasonic wave signal in the inverse direction of flow, the time for the ultrasonic wave signal arriving at the primary measurement sensor T1 is t1, and the time for the ultrasonic wave signal arriving at the secondary measurement sensor T2 is T2, where t1=L/(c+u) and t2=L/(c−u).

Since the flow velocity of fluid in an industrial pipe is much smaller than the sound velocity, that is, c>>u, the time difference between them is $\nabla t = t2 - t1 = 2Lu/cc$. This shows when the propagation velocity c of the acoustic wave in the fluid is known, the flow velocity u can be calculated only if the time difference $\nabla t$ is detected, and the flow quantity Q can be further calculated. The method to measure the flow quantity with this principle is the so-called time difference method. In addition, the phase difference method, the frequency differences method and the like may also be used.

In other embodiments, the electrical signal may be an excitation pulse signal. The signal parameter may be a pulse number of the excitation pulse signals transmitted to the first transduction element before the control unit receiving the first reception signal, or a pulse number of the excitation pulse signals transmitted to the second transduction element before the control unit receiving the second reception signal. At this point, the signal control element includes the electrical signal generating unit, the timing unit and the control unit.

Figure 4:
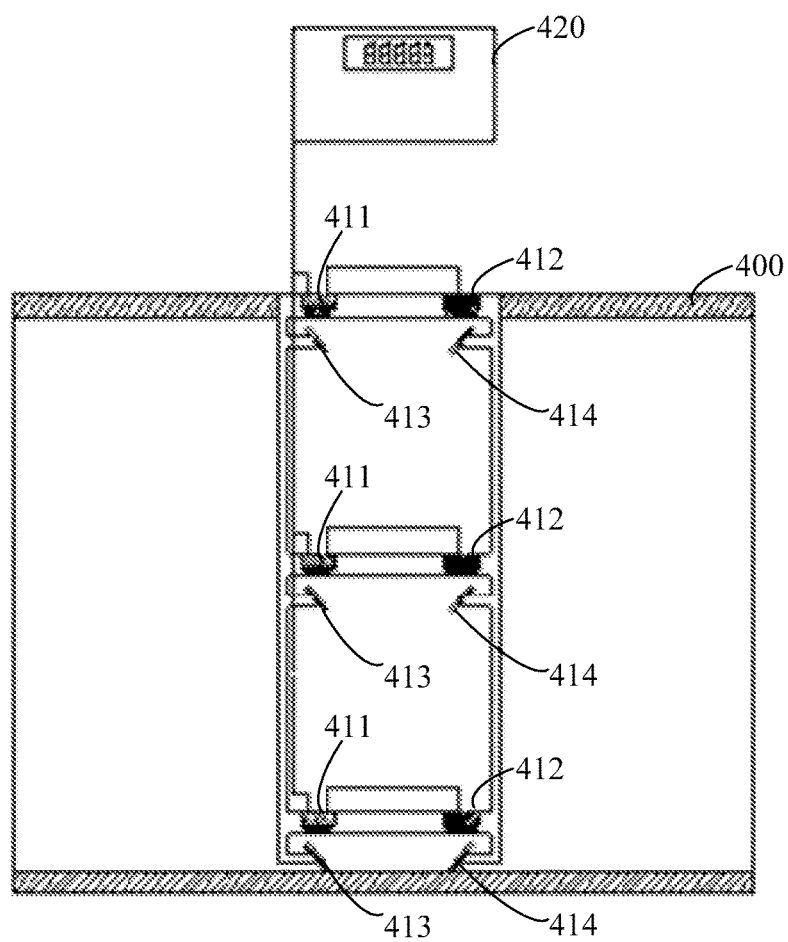
FIG. 4 is a structural schematic diagram illustrating a second implementation of the ultrasonic measurement system according to the present disclosure.

Refer to FIG. 4, which is a structural schematic diagram illustrating a second implementation of the ultrasonic measurement system according to the present disclosure.

The ultrasonic measurement system of this implementation is adapted for the measurement of the flow quantity of the liquid in a large diameter pipe 400. The measurement subsystems are mounted on different cross sections in an axial direction of the large diameter pipe 400 respectively. Each of the measurement subsystems is coupled to a flow quantity display 420 mounted outside the large diameter pipe 400 respectively. Each measurement subsystem 410 may include a primary measurement sensor 411, a secondary measurement sensor 412, a first reflection element 413 and a second reflection element 414.

The measurement subsystems and the subsystem summarization processing device 420 may be mounted in a serial-type mounting construction to form the ultrasonic measurement system of this implementation, to greatly decrease the mounting size of the ultrasonic measurement system, simplify the wiring design of the ultrasonic measurement system, and realize miniaturization and simplification of the ultrasonic measurement system. Only the number of the measurement subsystems is required to be modified for a large diameter pipe 400 with a different diameter, to avoid redesigning the hardware circuit system.

Figure 5:
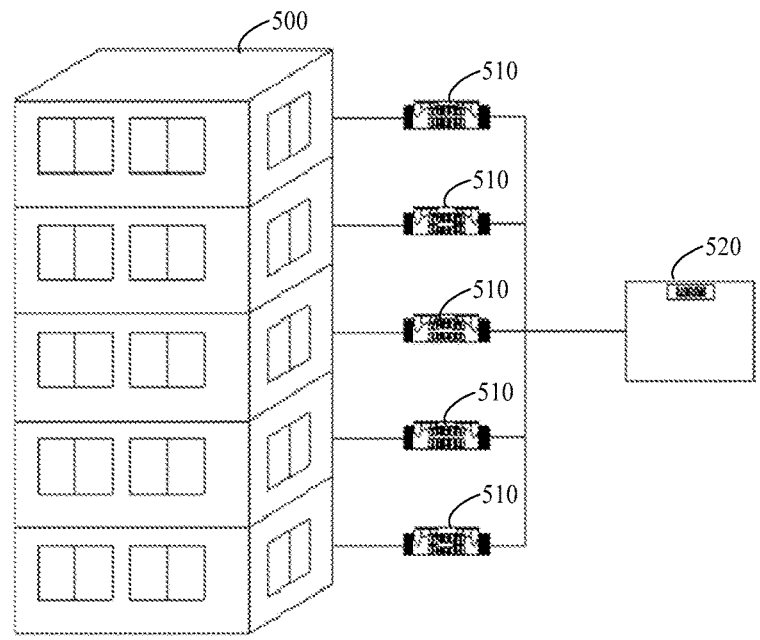
FIG. 5 is a structural schematic diagram illustrating a third implementation of the ultrasonic measurement system according to the present disclosure.

Refer to FIG. 5, which is a structural schematic diagram illustrating a third implementation of the ultrasonic measurement system according to the present disclosure.

The ultrasonic measurement system of this implementation is adapted for the measurement of the flow quantity of the liquid in a main pipe of a building 500. The measurement subsystems 510 are mounted in branch pipes on different floors of the building 500 respectively. Each of the measurement subsystems 510 is coupled to a flow quantity display 520 mounted outside the building 500.

The measurement subsystems 510 and the subsystem summarization processing device 520 may be mounted in a serial-type mounting construction to form the ultrasonic measurement system of this implementation, to greatly decrease the mounting size of the ultrasonic measurement system, simplify the wiring design of the ultrasonic measurement system, and realize miniaturization and simplification of the ultrasonic measurement system. Only the number of the measurement subsystems is required to be modified for a building 500 with different floors, to avoid redesigning the hardware circuit system.

Figure 6:
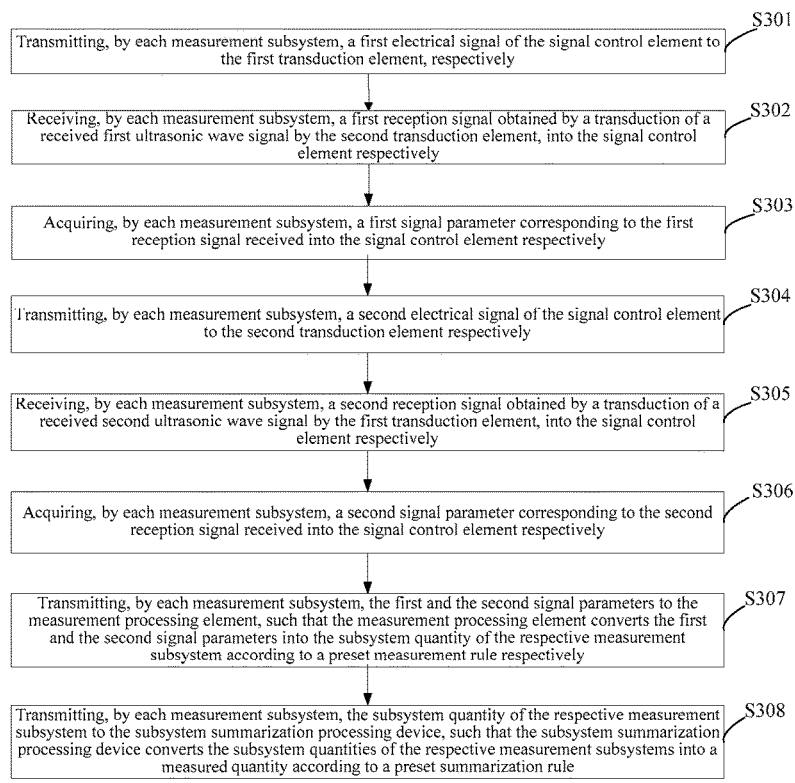
FIG. 6 is a flow diagram illustrating a first implementation of the measurement method of the ultrasonic measurement system according to the present disclosure.

Refer to FIG. 6, which is a flow diagram illustrating a first implementation of the measurement method of the ultrasonic measurement system according to the present disclosure.

In this implementation, the ultrasonic measurement system is a system as shown in any one of FIGS. 1-5. The measurement method of this implementation may include the following steps:

step S301, transmitting, by each measurement subsystem, a first electrical signal of the signal control element to the first transduction element respectively;

step S302, receiving, by each measurement subsystem, a first reception signal obtained by a transduction of a received first ultrasonic wave signal by the second transduction element, into the signal control element respectively, wherein the first ultrasonic wave signal is transmitted by the first transduction element;

step S303, acquiring, by each measurement subsystem, a first signal parameter corresponding to the first reception signal received into the signal control element respectively;

step S304, transmitting, by each measurement subsystem, a second electrical signal of the signal control element to the second transduction element respectively;

step S305, receiving, by each measurement subsystem, a second reception signal obtained by a transduction of a received second ultrasonic wave signal by the first transduction element, into the signal control element respectively, wherein the second ultrasonic wave signal is transmitted by the second transduction element;

step S306, acquiring, by each measurement subsystem, a second signal parameter corresponding to the second reception signal received into the signal control element respectively;

step S307, transmitting, by each measurement subsystem, the first and the second signal parameter to the measurement processing element, such that the measurement processing element converts the first and the second signal parameter into the subsystem quantity of the respective measurement subsystem according to a preset measurement rule respectively; and step S308, transmitting, by each measurement subsystem, the subsystem quantity of the respective measurement subsystem to the subsystem summarization processing device, such that the subsystem summarization processing device converts the subsystem quantities of all the measurement subsystems into a measured quantity according to a preset summarization rule.

In this embodiment, the measurement is performed with the subsystem summarization processing device and at least two measurement subsystems mounted on different areas to be measured, each measurement subsystem having a signal control element and a measurement processing element independent. Each measurement subsystem can independently control the first and second transduction elements to transmit an ultrasonic wave signal or collect an ultrasonic wave signal, and acquire the signal parameters corresponding to the signal collected by the first and second transduction elements thought the signal control element, and can independently control the measurement processing element to process the signal parameters to generate the subsystem quantity directly. There is no requirement for the long-distance transmission of the signal collected by the primary and secondary measurement sensors, which can reduce the error caused by the propagation delay of the signal, while saving the transmission line and reducing the structure space of the measure device, and can effectively avoid the affect of the unstable factors in the external environment on the signal propagation, to improve the reliability and measurement accuracy of the measurement subsystem. Further, the subsystem quantity of each measurement subsystem can be transmitted to the subsystem summarization processing device respectively, such that the subsystem summarization processing device can convert the subsystem quantity of each measurement subsystem into a measured quantity, and the measured value measured in different measurement areas at the same time can be further converted into the measured quantity according to a preset summarization rule, to avoid the affect of the transient variation in the quantity to be measured on the final measured value, that is, a more accurate final measured value can be obtained by reference of the different measurement areas.

For the step S301, if the measurement is performed by the measurement principle of time difference method, the transmission time of the first electrical signal may be stored while transmitting the first electrical signal of the signal control element to the first transduction element. If the measurement is performed by the measurement principle of frequency difference method, the measurement principle of phase difference method or other conventional measurement principles in the art, other corresponding operations can be made while transmitting the first electrical signal of the signal control element to the first transduction element.

For the step S302, if the measurement is performed by the measurement principle of time difference method, the reception time of the first reception signal received into the signal control element may be stored while receiving the first reception signal into the signal control element. If the measurement is performed by the measurement principle of frequency difference method, the measurement principle of phase difference method or other conventional measurement principles in the art, other corresponding operations can be made while receiving the first reception signal into the signal control element.

For the step S305, if the measurement is performed by the measurement principle of time difference method, the transmission time of the second electrical signal may be stored while transmitting the second electrical signal of the signal control element to the second transduction element. If the measurement is performed by the measurement principle of frequency difference method, the measurement principle of phase difference method or other conventional measurement principles in the art, other corresponding operations can be made while transmitting the second electrical signal of the signal control element to the second transduction element.

For the step S306, if the measurement is performed by the measurement principle of time difference method, the reception time of the second reception signal received into the signal control element may be stored while receiving the second reception signal into the signal control element. If the measurement is performed by the measurement principle of frequency difference method, the measurement principle of phase difference method or other conventional measurement principles in the art, other corresponding operations can be made while receiving the second reception signal into the signal control element.

For the step S307, the preset measurement rule may be a measurement rule of time difference method, a measurement rule of frequency difference method, a measurement rule of phase difference method or others conventional measurement rules in the art.

In one embodiment, if the preset measurement rule is a measurement rule of time difference method, the step of acquiring a first signal parameter corresponding to the first reception signal received into the signal control element may include the following steps:

acquiring the transmission time of the first electrical signal transmitting to the first transduction element; and acquiring the reception time of the first reception signal received into the signal control element.

And the step of acquiring a first signal parameter corresponding to the first reception signal received into the signal control element may include the following steps:

acquiring the transmission time of the second electrical signal transmitting to the second transduction element; and acquiring the reception time of the second reception signal received into the signal control element.

For the step S308, the preset summarization rule may be a weighted integration rule. For example, the subsystem quantity of each measurement subsystem may be provided with a respective weight in advance respectively, and the subsystem summarization processing device may multiply the subsystem quantity of each measurement subsystem by the respective weight respectively, and then total the results by the multiplication to generate the measured quantity.

The above are embodiments of the disclosure described in detail, and should not be deemed as limitations to the scope of the present disclosure. It should be noted that variations and improvements will become apparent to those skilled in the art to which the present disclosure pertains without departing from its spirit and scope. Therefore, the scope of the present disclosure is defined by the appended claims.

The invention claimed is:

1. An ultrasonic measurement system, comprising:
a subsystem summarization processing device; and
at least two measurement subsystems mounted on different regions of a flow of liquid or gas to be measured,
wherein each measurement subsystem includes a primary measurement sensor and a secondary measurement sensor, wherein the primary measurement sensor includes a first housing, and a first transduction element, a measurement processing element and a signal control element mounted within the first housing respectively, the first transduction element being mounted on a bottom end surface of the first housing, wherein the secondary measurement sensor includes a second housing, and a second transduction element mounted on a bottom end surface of the second housing, wherein the signal control element is coupled to the first transduction element, the second transduction element and the measurement processing element respectively, and configured to transmit an electrical signal to the first and second transduction elements, wherein the first and second transduction elements are adapted to transduce the electrical signal into an ultrasonic wave signal and transmit the ultrasonic wave signal to a channel carrying the flow to be measured respectively, wherein the first transduction element is further adapted to receive an ultrasonic wave signal transmitted by the second transduction element, transduce the received ultrasonic wave signal into a second reception signal and transmit the second reception signal to the signal control element, wherein the second transduction element is further adapted to receive an ultrasonic wave signal transmitted by the first transduction element, transduce the received ultrasonic wave signal into a first reception signal and transmit the first reception signal to the signal control element, wherein the signal control element is further configured to acquire signal parameters corresponding to the electrical signal, the first reception signal and the second reception signal, and transmit the corresponding signal parameters to the measurement processing element, wherein the measurement processing element is configured to convert the corresponding signal parameters into a subsystem quantity for each measurement subsystem, wherein the measurement processing element of each of the measurement subsystems is coupled to the subsystem summarization processing device respectively to transmit the subsystem quantity of the respective measurement subsystem to the subsystem summarization processing device, and wherein the subsystem summarization processing device is configured to convert the subsystem quantity of the respective measurement subsystem into a measured quantity.

2. The ultrasonic measurement system of claim 1, wherein each of the first and second transduction elements is a piezoelectric ceramic plate.

3. The ultrasonic measurement system of claim 1, wherein the signal control element includes an electrical signal generating unit, a timing unit and a control unit, the control unit being coupled to the timing unit and the electrical signal generating unit respectively, and the electrical signal generating unit is coupled to the first and second transduction elements respectively.

4. The ultrasonic measurement system of claim 1, wherein the primary measurement sensor further includes a PCB on which the measurement processing element and the signal control element are integrated.

5. The ultrasonic measurement system of claim 4, wherein the primary measurement sensor further includes a connecting component which is connected between the PCB and the first transduction element.

6. The ultrasonic measurement system of claim 4, wherein the primary measurement sensor further includes a pouring sealant shockproof layer which is filled between the PCB and a top end surface of the first housing.

7. The ultrasonic measurement system of claim 1, further comprising a display device coupled to the subsystem summarization processing device.

8. The ultrasonic measurement system of claim 1, further comprising a measurement pipe, wherein the measurement subsystems are mounted on different cross sections in an axial direction of the measurement pipe respectively.

9. The ultrasonic measurement system of claim 8, wherein each measurement subsystem further includes first and second reflection elements mounted within the measurement pipe, the first reflection element and the first transduction element having an angle of 45 degrees between each other, and the second reflection element and the second transduction element having an angle of 135 degrees between each other.

10. A measurement method with an ultrasonic measurement system including a subsystem summarization processing device and at least two measurement subsystems mounted on different regions of a flow of liquid or gas to be measured, the method comprising:

transmitting, by each measurement subsystem, a first electrical signal of a signal control element to a first transduction element respectively, wherein each measurement subsystem includes a primary measurement sensor and a secondary measurement sensor, the primary measurement sensor including a first housing, and the first transduction element, a measurement processing element and the signal control element mounted within the first housing respectively, and the secondary measurement sensor including a second housing, and a second transduction element;

receiving, by each measurement subsystem, a first reception signal obtained by a transduction of a received first ultrasonic wave signal by the second transduction element, into the signal control element respectively, wherein the first ultrasonic wave signal is transmitted by the first transduction element to a channel carrying the flow to be measured respectively;

acquiring, by each measurement subsystem, a first signal parameter corresponding to the first reception signal received into the signal control element respectively;

transmitting, by each measurement subsystem, a second electrical signal of the signal control element to the second transduction element respectively;

receiving, by each measurement subsystem, a second reception signal obtained by a transduction of a received second ultrasonic wave signal by the first transduction element, into the signal control element respectively, wherein the second ultrasonic wave signal is transmitted by the second transduction element to the channel carrying the flow to be measured respectively;

acquiring, by each measurement subsystem, a second signal parameter corresponding to the second reception signal received into the signal control element respectively;

transmitting, by each measurement subsystem, the first and the second signal parameters to the measurement processing element, such that the measurement processing element converts the first and the second signal parameters into the subsystem quantity of the respective measurement subsystem according to a preset measurement rule respectively; and transmitting, by each measurement subsystem, the subsystem quantity of the respective measurement subsystem to the subsystem summarization processing device, such that the subsystem summarization processing device converts the subsystem quantities of all the measurement subsystems into a measured quantity according to a preset summarization rule.

* * * * *